Nov. 10, 1936.   G. F. YAGER ET AL   2,060,159
CHAMFERING MACHINE
Filed Dec. 30, 1933   3 Sheets-Sheet 3
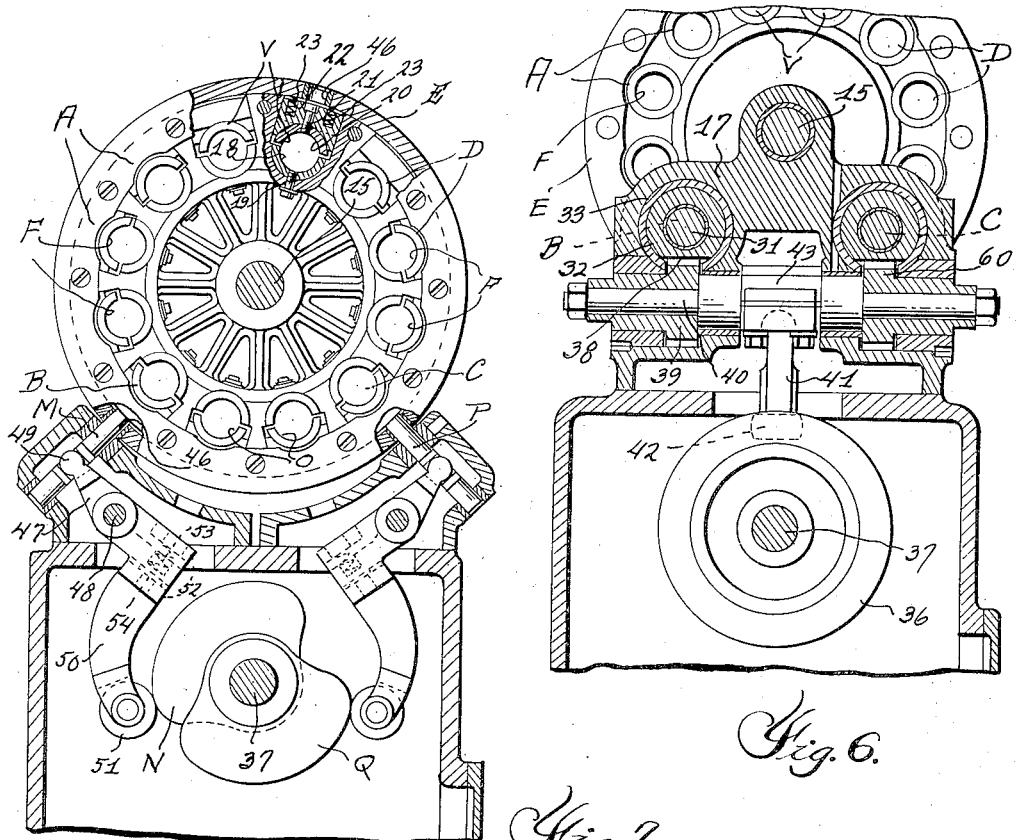
Fig. 6.
Fig. 7.
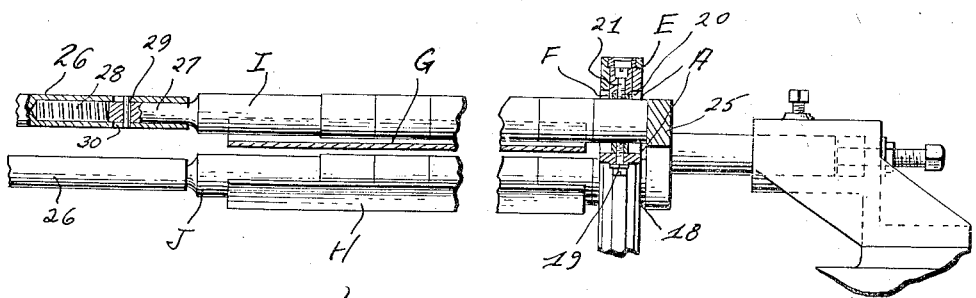
Fig. 5.
INVENTORS
George F. Yager
Oliver J. Heath
BY
ATTORNEYS

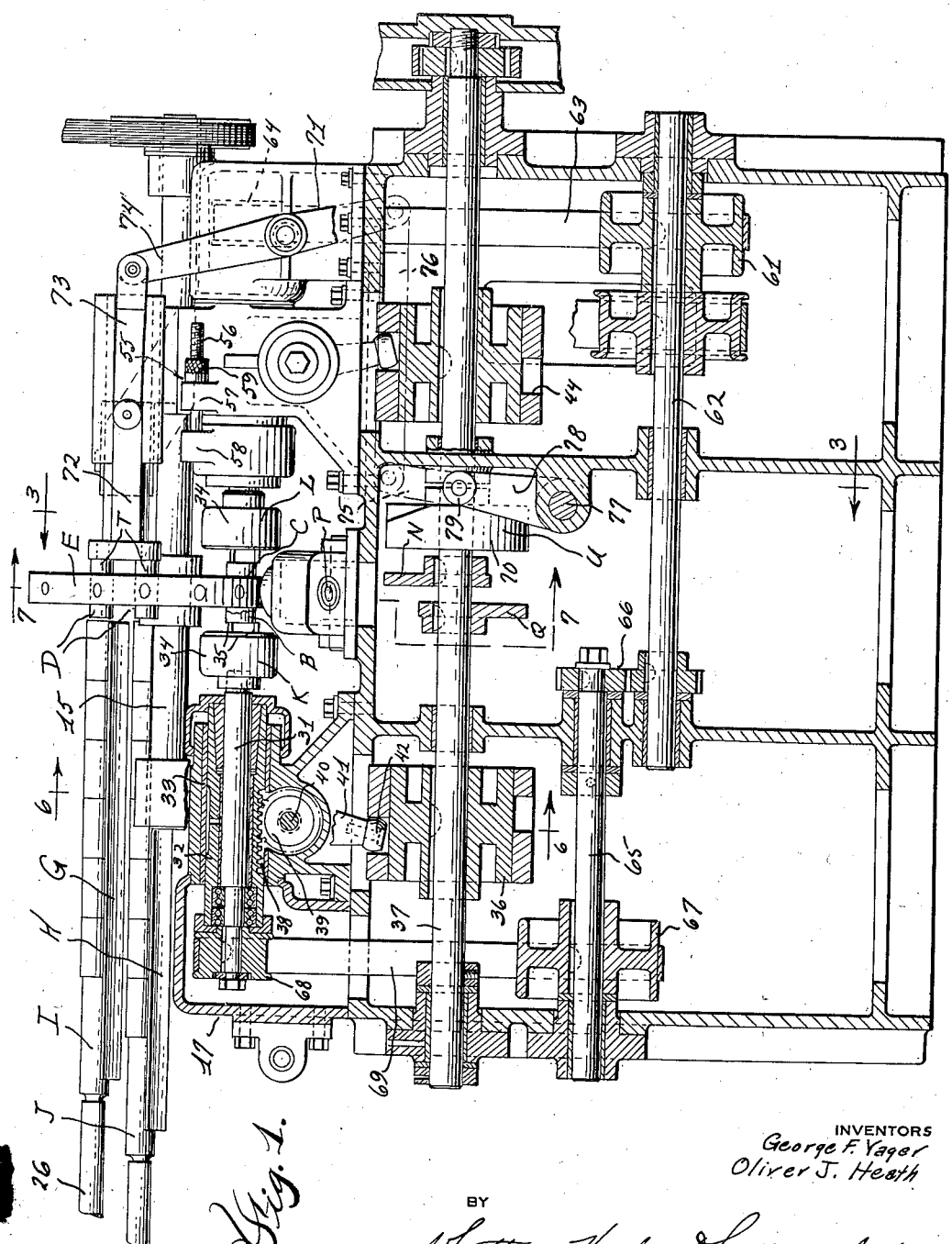

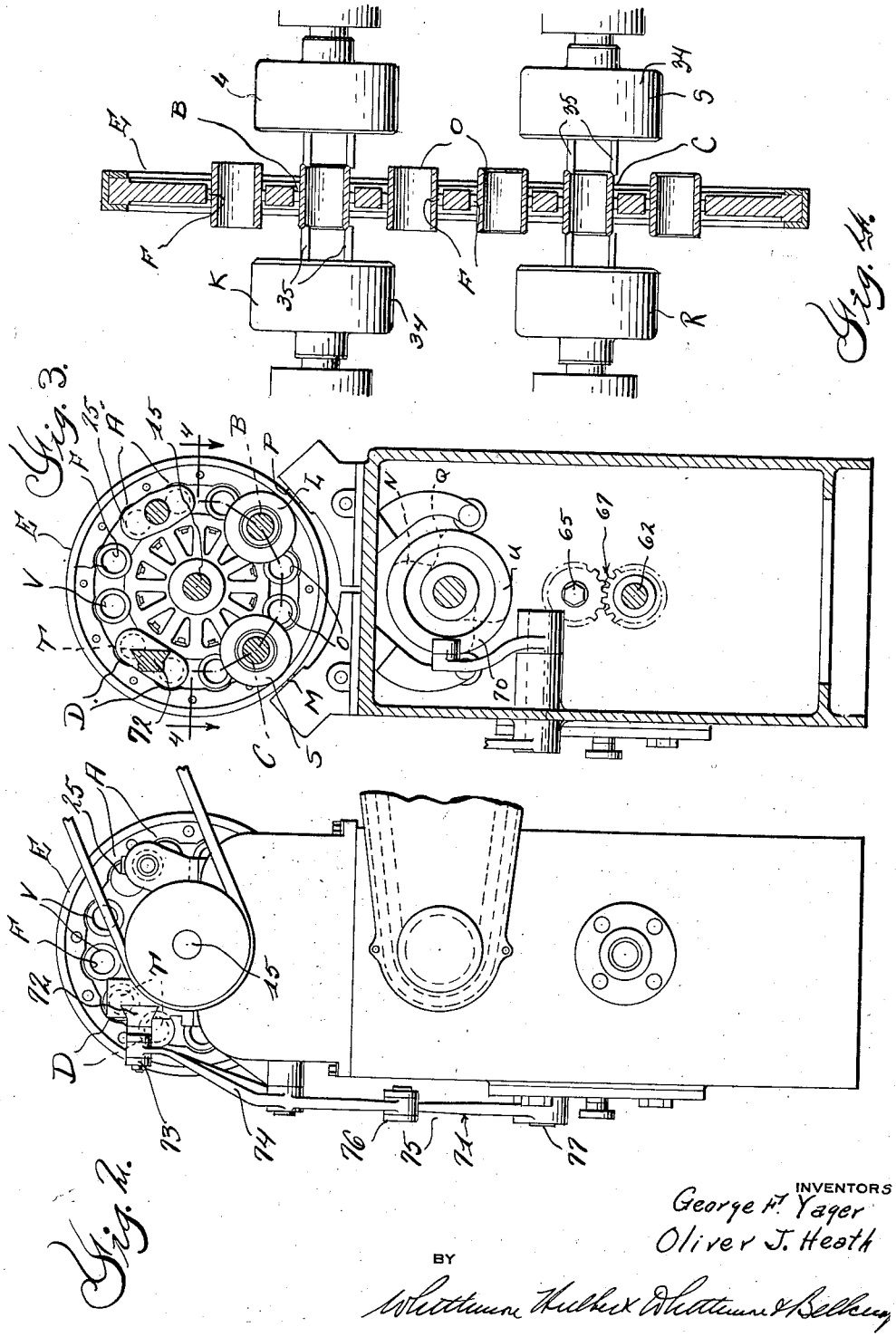

UNITED STATES PATENT OFFICE 2,060,159

CHAMFERING MACHINE

George F. Yager and Oliver J. Heath, Toledo, Ohio, assignors to The Bunting Brass and Bronze Company, Toledo, Ohio, a corporation of Ohio Application December 30, 1933, Serial No. 704,736

16 Claims. (Cl. 82—2)

This invention relates generally to metal working machines and refers more particularly to apparatus for chamfering the ends of bushings or like members.

One of the principal objects of the present invention is to simplify and at the same time expedite chamfering the ends of bushings or like members by providing a machine which is thoroughly automatic in operation.

Another feature of this invention which contributes materially to increasing the production of bushings of the type having the inner and outer edges of opposite ends thereof chamfered, resides in the provision of a machine having mechanism capable of simultaneously chamfering opposite ends of the bushings to secure the above construction.

The rate of production of the machine is further increased by providing mechanism capable of simultaneously chamfering the opposite ends of a plurality of bushings and by providing means for automatically ejecting the bushings from the machine upon completion of the chamfering operations.

Another advantageous feature of this invention resides in the provision of a machine having a work holder carrying a series of clamps for securing a plurality of bushings thereto and having means for periodically moving the work holder in timed relation to the operation of the chamfering devices to successively register the bushings with the latter.

A further object of this invention resides in the provision of means operable during the intervals of rest of the work holder to automatically load the clamps on the latter with bushings to be chamfered upon completion of the operation of the ejecting means previously mentioned.

In addition to the foregoing, the present invention contemplates the provision of means operable during the intervals of rest of the holder to secure the same against movement and to fixedly secure the bushings to the holder during the chamfering operations.

The foregoing as well as other objects will be made more apparent as this description proceeds, especially when considered in connection with the accompanying drawings, wherein:

Figure 1 is a side elevational view, partly in section, of a chamfering machine constructed in accordance with this invention;

Figure 2 is an elevation of one end of the chamfering machine;

Figure 3 is a sectional view taken substantially on the line 3—3 of Figure 1;

Figure 4 is an enlarged sectional view taken substantially on the line 4—4 of Figure 3;

Figure 5 is a detail view, partly in section, featuring the loading mechanism;

Figure 6 is a sectional view taken substantially on the line 6—6 of Figure 1;

Figure 7 is a sectional view taken substantially on the line 7—7 of Figure 1.

The chamfering machine selected herein for the purpose of illustration is capable of simultaneously chamfering the inner and outer edge portions of opposite ends of the bushings and may either be employed to chamfer one bushing at a time or to chamfer a plurality of bushings. Inasmuch as the production of the machine is greatly increased by chamfering a plurality of bushings simultaneously, the construction rendering this result possible is preferred, and, accordingly, the detailed description will be based upon this function of the machine.

In general, the chamfering machine comprises four stations designated herein by the reference characters A, B, C and D. The stations A and D will be referred to hereinafter as the loading and unloading stations, respectively, while the stations B and C will be designated as the chamfering stations. Each of the four stations previously referred to is predeterminedly located with respect to a work-holding turret E operable by a step-by-step movement and having a plurality of bushing clamps F secured thereto in circumferential spaced relationship. The particular location of the four stations with respect to the turret and the degree of travel of the latter, as well as the number and spacing of the clamps, are such that at the termination of each interval of advancement of the turret, two of the work-holding clamps assume positions in registration with the unloading station D and two of the clamps previously unloaded at D assume positions in registration with station A, while only one of the clamps registers with each of the chamfering stations.

The loading station A comprises a pair of guides G and H spaced one above the other and terminating at the inner ends adjacent the turret E. The outer ends of the guides may communicate with suitable chutes (not shown) for depositing bushings upon the latter ends, and suitable reciprocable plungers I and J are associated with the outer ends of the guides G and H, respectively, for transferring the bushings deposited upon the guides into the clamps on the turret registering with the inner ends of the guides. The plunger I reciprocates in the direction of length of the guide G, while the plunger J has a corresponding movement in the direction of the length of the guide H, and both of the above plungers are automatically operated during the intervals of rest of the turret E to load the two clamps on the turret in registration with the inner ends of the guides. As will be more fully hereinafter set forth, the cooperating jaws of the clamps F on the turret are normally merely yieldably urged toward each other so that they readily separate upon movement of a bushing between the same by the plungers.

Upon completion of the loading operation at station A, the turret E is advanced 60° to register one of the bushings with the chamfering station B. In the present instance, the chamfering station B is located 60° in the direction of advancement of the turret from the loading plunger J, and, as a consequence, indexing of the turret 60° registers the bushing in the clamp opposite the plunger J with the chamfering station B. Located at the station B is a pair of chamfering devices K and L positioned in axial alignment upon opposite sides of the turret and operable in timed relation to advancement of the turret to chamfer both the inner and outer edge portions of opposite ends of the bushing therebetween. Prior to the actuation of the chamfering devices to chamfer opposite ends of the bushing therebetween, accidental movement of the turret and displacement of a bushing relative to the turret is prevented by a plunger M movable to effect this dual result in timed relation to the operation of the turret by means of a cam N. It should be understood that during the chamfering operation at station B, the pair of clamps positioned opposite the loading station A by the aforesaid advancement of the turret is being loaded through the medium of the plungers I and J.

Upon completion of the chamfering operation by the aforesaid devices at station B, the plunger M is moved by the cam N to its inoperative position and the turret E is advanced another 60° to register the first bushing in the second pair of clamps with the chamfering station B whereupon the operation previously referred to is repeated. At the termination of this latter advancement of the turret, the first pair of bushings assume positions opposite an idle station O, and, of course, a third pair of clamps registers with the loading station A.

Upon completion of another indexing movement of the turret E, the bushing in the second clamp of the first pair registers with the chamfering station C, and the clamp for this bushing is positively actuated to rigidly secure the bushing in place by means of a second plunger P operated in timed relation to the actuation of the turret through the medium of a cam Q. Located at the station C is a second pair of chamfering devices R and S identical in construction to the devices at station B in that they operate during the interval of rest of the turret to chamfer both the inner and outer edge portions of opposite ends of the bushing therebetween. Upon completion of the chamfering operation, the plunger P is retracted by the cam Q and the turret E is again indexed to register bushings in the first pair of clamps with the unloading station D whereupon these bushings are ejected from the turret by plungers T operated in timed relation to the operation of the rest of the mechanism by means of a cam U.

Upon completion of the next indexing movement of the turret E, the pair of clamps previously unloaded at D assumes a position opposite an idle station V adjacent the loading station A so that at the termination of the next indexing movement of the turret, these clamps will again register with the plungers at station A. It will be apparent from the foregoing that the first bushing in each pair of clamps loaded at station A is chamfered at station B, while the bushing in the other of said clamps is chamfered at station C. It will further be observed from the aforesaid brief description that during the intervals of rest of the turret E, a pair of bushings is simultaneously chamfered and a pair of completed bushings is ejected from the turret.

Attention may be called to the fact at this point that the machine may be employed with equal facility in instances where only one clamp of each pair is loaded with a bushing at station A. In this connection, reference is made to Figure 3 wherein it will be observed that irrespective of which of the clamps are loaded at station A, the bushing will be properly chamfered due to the relative locations of the chamfering stations B and C. In other words, if the bushing is loaded in the first clamp of each pair, the same will be chamfered at station B or if the bushing is loaded in the second clamp, the same will be chamfered at station C.

Referring now more in detail to the particular construction of the chamfering machine, it will be noted that the turret E is fixed to a shaft 15 journaled in bearings carried by the frame 17 and driven by suitable indexing mechanism. The indexing mechanism is preferably such as to periodically rotate the turret E throughout an angular travel of 60° and to provide intervals of rest between successive advancements of the turret of sufficient duration to permit the several stations to perform their respective operations on the bushings in registration therewith. One type of indexing mechanism which may be employed advantageously for accomplishing the above result is shown in my copending application, Serial No. 702,042, filed December 12, 1933.

As shown particularly in Figure 7, the bushings are held in assembled relation with the turret by means of a plurality of clamps F carried by the turret adjacent the periphery thereof with the centers arranged on a common radius determined from the axis of rotation of the turret. In the present instance, twelve clamps are mounted upon the turret and the centers aforesaid of these clamps are spaced 30° from each other for reasons to be presently set forth. Each of the twelve clamps F is provided with an inner stationary jaw 18 fixed as at 19 to the turret E in cooperative relationship with a movable jaw 20 which in turn is secured as at 21 to a block 22 mounted within the turret for radial sliding movement. The blocks 22 and, as a consequence, the outer jaws 20 of the clamps are normally urged toward the fixed jaws 18 by means of suitable coil springs 23 located within counterbored recesses in the outer faces of the blocks and abutting portions of the turret in the manner clearly shown in Figure 7. When unloaded, the substantially circular opening formed by the cooperating jaw sections of each clamp is of slightly less diameter than the bushings to be inserted therebetween, and although the springs 23 are of sufficient strength to provide the clamping action required to hold the bushings in assembled relation with the turret during advancement of the same, nevertheless, they are responsive to the action of the loading plungers at station A to permit the necessary radial outward movement of the outer jaw sections for receiving the bushings.

The loading plunger J is spaced 60° from the first clamp of the pair in registration with the idle station V, and the loading plunger I is spaced 60° from the remaining clamp in registration with this latter idle station so it necessarily follows that advancement of the turret E 60° by the indexing mechanism (not shown) registers both the clamps opposite the idle station V with the loading plungers I and J. It has been previously stated that during the interval of rest of the turret E, the aforesaid loading plungers are actuated to transfer a bushing on each of the guides in registration with the plungers into the clamps on the turret opposite the inner ends of the guides. The bushings thus loaded in the clamps on the turret are properly positioned with respect to the latter by means of a stop 25 accurately located upon the frame of the machine at the side of the turret E opposite the side of the latter upon which the plungers are positioned so as to form an abutment for the bushings. In order to compensate for bushings of various lengths without interfering with the strokes of the loading plungers, the latter are connected to the push rods 26 for axial movement relative thereto. In detail, the plungers are provided with reduced outwardly extending portions 27 telescopically engaging within the inner ends of their respective push rods and normally urged in an inward direction relative to the rods by means of a coil spring 28 located within each of the rods in advance of the reduced portions 27 on the plungers for engaging the outer ends thereof. Displacement of the plungers from engagement with their respective rods is prevented by means of pins 29 extending transversely through the reduced portions 27 of the plungers and having the extremities thereof engageable in suitable slots 30 formed in the push rods 26. The slots 30 are elongated in the direction of the axes of the rods so as to insure the desired relative movement between the latter and associated plungers. It will be apparent from the foregoing that should the bushings engage the stops 25 before the push rods reach the end of their stroke, the springs 28 will merely be compressed permitting the plungers associated with the rods to remain stationary during the remaining portion of the stroke. The particular construction of the plungers previously described, in addition to compensating for bushings of various lengths, also compensates for any relative variation in the position of the bushings on the receiving ends of the guides prior to engagement thereof by the plungers. The means for effecting operation of the push rods in timed relation to the indexing movement of the turret E is not shown herein, but, if desired, may be accomplished by suitable cam means of the type disclosed in my copending application above identified.

The chamfering station B is spaced 60° from the loading plunger J so that upon termination of the next indexing movement of the turret E, the bushing loaded by the plunger J assumes a position in registration with the aligned chamfering devices K and L. During the interval of rest of the turret E, the chamfering devices are moved toward each other into engagement with opposite ends of the bushing, and by reason of the construction thereof, the same function to chamfer both the inner and outer edge portions of the aforesaid ends of the bushing. The chamfering device K is identical in construction to the chamfering device L in axial alignment therewith upon the opposite side of the turret, and, consequently, a detailed description of the chamfering device K will also suffice for the device L. As shown particularly in Figure 1, the chamfering device K comprises a spindle 31 journaled in a sleeve 32 which in turn is mounted within a bearing 33 on the machine frame for axial sliding movement toward and away from the turret. The bearings for journaling the spindle 31 within the sleeve 32 are such as to require axial movement of the spindle with the sleeve, and the inner end of the spindle has secured thereto for rotation therewith a tool holder 34. The tool holder 34 may be of any suitable construction for securing a pair of chamfering tools 35 in the relationship required to respectively chamfer the inner and outer edges of the adjacent end of the bushing in the turret E. However, before the tools 35 can accomplish the chamfering operation, the spindle must be moved axially to engage the tools with the adjacent end of the bushing and this is accomplished herein by means of a cam 36 fixed upon a cam shaft 37 suitably journaled in the machine frame and operatively connected to the sleeve in the following manner. As shown, the lower side of the sleeve 32 is provided with a series of teeth 38 forming, in effect, a rack and meshing with a gear 39 fixed to a rockshaft 40 journaled in the machine frame with its axis extending at right angles to the axis of the spindle 31. The shaft 40 is connected to the cam for rocking movement thereby through the medium of a lever 41 having a cam follower 42 on the lower end thereof for engaging the cam 36 and connected at the upper end to the rockshaft 40 through the medium of a bearing cap 43. The cam shaft 37 is driven at a predetermined speed by any suitable means (not shown), and the development of the cam 36 is such as to move the cutting tools 35 into engagement with the bushing in timed relation to the operation of the turret E. In this connection, attention is called to the fact that the cooperating device L for simultaneously chamfering the opposite ends of the bushings is actuated by a cam 44 complementary to the cam 36 and also secured to the cam shaft 37 so that both devices will be moved into engagement with opposite ends of the bushing simultaneously.

The tool holders 34 are rotated during the chamfering operation in a manner to be presently described and the bushings are held stationary. With this arrangement, the torque exerted upon the bushings by the chamfering tools during rotation of the same would have a tendency to also rotate the bushings, and in order to maintain the bushings stationary during the chamfering operation, the clamps F are positively actuated to rigidly clamp the bushings opposite both the chamfering stations B and C. As briefly set forth in the description of the function of the machine, the clamp in registration with the chamfering station B is positively actuated by the plunger M through the medium of the cam N, while the clamp in registration with the chamfering station C is positively actuated by the plunger P through the medium of the cam Q. As shown in Figure 7, the aforesaid plungers are mounted for radial sliding movement in the frame of the machine with reference to the axis of rotation of the turret E, and in the innermost positions of the plungers, the inner ends thereof extend through openings 46 in the periphery of the turret E opposite the blocks 22 carrying the movable clamping jaws 20. The arrangement is such that the plungers positively engage the blocks and urge the movable clamping jaws 20 toward the cooperating stationary jaws 18 to securely clamp the bushings therebetween. The plunger M is operatively connected to the cam N by means of a rock arm 47 pivotally connected intermediate the ends thereof as at 48 to the machine frame and having the upper end suitably connected to the plunger as at 49. The lower end of the rock arm is operatively connected to an actuating lever 50 having a cam follower 51 thereon for engaging the cam N. The connection between the rock arm and actuating lever 50 is such as to compensate for variations in outside diameter of the bushings between the jaws of the clamp in association with the plunger, and this is accomplished herein by extending the lower end of the rock arm between a pair of shoulders 52 formed on the actuating lever in the manner clearly shown in Figure 7. The space between the shoulders 52 is greater than the corresponding dimension of the lower end of the rock arm, and movement of the latter relative to the stops 52 is resisted by means of a spring 53 disposed between the upper side of the aforesaid end of the rock arm and adjacent stop 52. The spring as well as the rock arm, is held in assembled relation with the actuating lever through the medium of a suitable screw 54 anchored in the stops 52. Although the spring induces a certain amount of flexibility in the operation of the plunger M to effect the desired clamping action for the purpose specified above, nevertheless, the degree of flexibility is not sufficient to permit rotation of the bushings during the chamfering operation. The plunger P is operated from the cam Q in the same manner as the plunger M is operated from the cam N. Both the cams for actuating the plungers are mounted on the cam shaft 37 and are so developed as to effect operation of the plungers for the purpose specified as soon as the turret E comes to rest and before the chamfering tools are engaged with opposite ends of the bushings.

In order to permit adjusting the tool holders 34 for the chamfering devices to vary the depth of the chamfer, a micrometer adjustment 55 is provided upon each of the devices. The micrometer adjustments associated with each of the chamfering devices are identical in construction, and, accordingly, only one of these devices will be described in detail herein. The micrometer adjustment for the chamfering spindle L is shown in Figure 1 and comprises a stud 56 slidably mounted within an ear 57 fixed upon the frame of the machine, and the inner end of the stud is secured to a collar 58 which in turn is fixed upon the inner end of the sleeve 32. Threaded upon the stud 56 outwardly beyond the ear 57 and forming a stop for engaging the latter are adjusting nuts 59 operable to vary the depth of chamfer in the following manner. The connections between the rockshafts 40 and actuating arms 41 are loosened permitting the rockshafts to be rotated relative to the arms. Inasmuch as the rockshafts are connected to the spindles through the medium of gears and sleeves 32, rocking movement of the shafts will vary the positions of the chamfering tools 35 carried by the spindles relative to the opposite ends of the bushings. Assuming, for example, that it is desired to move the tool holders 34 outwardly with respect to adjacent ends of the bushings therebetween, the adjusting nuts 59 are rotated relative to the spindles in a direction to coact with the ears 57 to draw the spindles outwardly until the desired adjustment is obtained whereupon the aforesaid connections between the rockshafts are again tightened. On the other hand, if it is desired to move the tool holders inwardly toward the ends of the bushings, the adjusting nuts 59 are merely backed away from the fixed ears 57 a distance equal to the extent of the desired inward adjustment of the tools, and the rockshafts 40 are rotated the extent necessary to reengage the adjusting nuts 59 with the fixed ears 57.

Upon completion of the chamfering operation at station B on the bushing previously loaded by the plunger J, the turret E is advanced another 60° to bring both clamps opposite the idle station O, and in this position of the clamps, the bushing in the clamp previously loaded by the plunger I is spaced 60° from the second chamfering station C so it necessarily follows that this latter bushing registers with the second chamfering station upon termination of the next indexing movement of the turret E. The chamfering devices at station C are identical to the chamfering devices K and L at station B. However, it is to be noted that the chamfering devices at the station C are actuated from the same cams employed in operating the spindles of the chamfering devices at station B. The chamfering device R at station C on the same side of the turret as the chamfering device K is actuated from the cam 36 by merely extending the rockshaft 40 associated with the chamfering device K and securing a second gear 60 upon this shaft for engaging the rack teeth on the sleeve of the chamfering device R. The cooperating chamfering device S on the opposite side of the turret at Station C is operated from the cam 44 in the same manner as indicated above in that the rockshaft 40 for the chamfering device L is merely extended to permit securing a second gear thereto for meshing with the rack teeth on the sleeve of the chamfering device S. With the above construction, the chamfering devices at both stations are actuated as a unit, and, as a consequence, the chamfering operation at both stations is effected simultaneously.

Reference has been made in the preceding description of the fact that the tool holders of the chamfering devices at both stations are rotatable relative to the bushings to effect the desired chamfering operation, and, in the present instance, the spindles carrying the tool holders of the spindles on one side of the turret E are rotated in a direction opposite to the direction of rotation of the cooperating spindles on the opposite side of the turret E. In detail, the chamfering devices on the right-hand side of the turret as viewed in Figure 1, are rotated by a pulley 61 fixed to a drive shaft 62 and operatively connected, through the medium of a belt 63, to suitable pulleys 64 secured to the outer ends of the spindles of said chamfering devices. The spindles of the chamfering devices at the opposite side of the turret E are rotated in a reverse direction by means of a driven shaft 65 operatively connected to the drive shaft through the medium of reverse gearing 66 and having a pulley 67 secured thereto. The pulley 67 is connected to the spindles of the latter chamfering devices by means of pulleys 68 fixed to the outer ends of said spindles and a belt 69 reeved around the pulleys 68 as well as the pulley 67. Both the shafts 62 and 65 are suitably journaled in the frame of the machine and the shaft 62 is driven from any suitable source of power (not shown herein). In connection with the pulleys 61 and 67, it is to be noted that these pulleys are relatively wide so as to permit the necessary axial travel of the pulleys on the spindles of the several chamfering devices.

Upon completion of the chamfering operation at station C, the turret is again advanced 60°, and upon termination of this advancement, the bushings are positioned in registration with the unloading plungers T. The latter are actuated in timed relation to the operation of the turret E by means of a cam 70 fixed to the cam shaft 37 and connected to the unloading plungers for reciprocating the same through the medium of a system of levers designated generally herein by the reference character 71. In detail, it will be noted from Figure 1 that both unloading plungers are secured to a common crosshead 72 which in turn is operatively connected to the inner end of a link 73 having the outer end thereof pivotally connected to the upper end of a rock arm 74 which in turn is pivoted intermediate the ends thereof to the frame of the machine. The lower end of the rock arm is pivotally connected to the upper end of a lever 75 through the medium of a link 76, and the lower end of the lever 75 is secured to a rockshaft 77 which in turn is operated by a rock arm 78 having a cam follower 79 thereon for engaging the cam 70. The cam 70 is so designed as to operate the plungers to eject the finished bushings from the turret E during the intervals of rest of the latter.

The complete operation of the chamfering apparatus will be readily apparent from the description of the function of the several mechanisms combining to form the apparatus, noted in the portion of the specification preceding the detailed description, and a further description of the operation at this point is believed unnecessary since it would merely constitute repetition.

What we claim as our invention is:

1. In a machine, a turret, work clamps carried by said turret in circumferentially spaced relationship, a pair of work guides spaced one above the other and terminating adjacent one side of the turret for registration with said clamps, means operable in timed relation to the turret for transferring work simultaneously from both guides into two of the clamps carried by the turret, a crosshead adjacent the other side of said turret, and a pair of plungers projecting from the crosshead for registration with the clamps in the turret, and means for actuating said crosshead in timed relation to the turret to cause the plungers to unload work simultaneously from two of the clamps.

2. In a machine, a turret, four stations predeterminedly located relative to said turret, one of said stations being a work loading station, two of said stations being chamfering stations, and one of said stations being a work unloading station, work clamps carried by said turret in circumferentially spaced relationship, the location of the four stations with respect to the turret, and the degree of travel of the turret, as well as the number and spacing of the clamps being such that at the termination of each interval of advancement of the turret two of the clamps assume positions in registration with the loading station, two of the clamps assume positions in registration with the unloading station, and one of the clamps registers with each of the chamfering stations.

3. In a machine, a turret, a movable jaw carried by said turret, actuating means for said jaw including a cam, a lever actuable by said cam, and a rock arm actuable by said lever and connected to said plunger, said lever having a pair of shoulders, a portion of said arm extending between said shoulders, the space between the shoulders being greater than the corresponding dimension of the portion aforesaid of said arm, means resisting movement of the arm relative to said shoulders, and means holding the means just mentioned and portion aforesaid of the rock arm in assembled relation, the construction and arrangement of the parts being such that the first mentioned means induces a certain amount of flexibility in the operation of the plunger.

4. In a machine, a turret, a movable jaw carried by said turret, actuating means for said jaw including a cam, a lever actuable by said cam, and a rock arm actuable by said lever and connected to said plunger, said lever having a pair of shoulders, a portion of said arm extending between said shoulders, the space between the shoulders being greater than the corresponding dimension of the portion aforesaid of said arm, a spring between said portion of the arm and one of said shoulders resisting movement of the arm relative to said shoulders, and a screw anchored in one of said shoulders and holding the spring and portion aforesaid of the rock arm in assembled relation, the construction and arrangement of the parts being such that the spring induces a certain amount of flexibility in the operation of the plunger.

5. In a metal working machine, a turret, and a plurality of clamps carried by said turret adjacent the periphery thereof, the centers of said clamps being spaced approximately thirty degrees apart on a common radius relative to the axis of rotation of the turret, each of said clamps having an inner stationary jaw and an outer movable jaw, the inner jaws being fixed to said turret, blocks rigid with the outer jaws, one block to each jaw, said blocks and outer jaws being mounted for radial sliding movement between the fixed jaws and the periphery of said turret, spring means associated with the blocks and turret and normally urging the movable jaws toward the fixed jaws, said spring means being yieldable to permit the necessary radial movement of the outer jaws for receiving work and having sufficient strength to provide the clamping action required to hold the work in assembled relation with the turret during advancement of the turret, the periphery of said turret being provided in radial alignment with the movable jaws with openings, a tool engageable with work in said jaws, and means operable while the tool is in engagement with the work for holding the outer jaws toward the fixed inner jaws to securely clamp the work, including a plunger movable through said openings and positively engageable with said blocks.

6. In a metal working machine, a turret, and a plurality of clamps carried by said turret in circumferentially spaced relationship, each of said clamps having an inner stationary jaw and an outer movable jaw, the inner jaws being fixed to said turret, blocks rigid with the outer jaws, one block to each jaw, said blocks and outer jaws being mounted for radial sliding movement between the fixed jaws and the periphery of said turret, and spring means associated with the blocks and turret and normally urging the movable jaws toward the fixed jaws, said spring means being yieldable to permit the necessary radial movement of the outer jaws for receiving the work and having sufficient strength to provide the clamping action required to hold the work in assembled relation with the turret during advancement thereof.

7. In a machine, a turret, a work clamp carried by the turret and having a radially slidable jaw adjacent the periphery of the turret, and means movable in timed relation to the turret for holding the same against accidental movement and for holding work against displacement from the clamp including a plunger movable through a portion of the turret relative to said movable jaw.

8. In a machine, a turret, a movable work clamping element carried thereby, a plunger for holding the turret against accidental movement and for positively actuating said clamping element, a positive driving element, and a driving connection between said driving element and plunger yieldable to compensate for work of different sizes.

9. In a metal working machine, a turret provided in its periphery with circumferentially spaced radially extending openings, work gripping means wholly within said turret adjacent said periphery including work engaging jaws slidable radially of the turret at the inner ends of and substantially in line with the radially extending openings aforesaid, and means free of the turret for actuating said jaws including a single plunger supported exteriorly of the turret and successively engageable with the radially extending openings, and means for reciprocating said plunger to and from said openings including means providing for variations in the throw of said plunger to compensate for work of different dimensions.

10. In a metal working machine, a turret provided in its periphery with circumferentially spaced radially extending openings, work gripping means wholly within said turret adjacent said periphery including work engaging jaws slidable radially of the turret at the inner ends of and substantially in line with the radially extending openings aforesaid, a stationary support adjacent the turret, and means free of the turret for actuating said jaws including a single plunger carried by said stationary support and successively engageable with the radially extending openings.

11. In a machine, a turret, a series of work clamps carried by said turret, a pair of work guides terminating adjacent one side of the turret for registration with said clamps, means operable in timed relation to the turret for transferring work simultaneously from both guides into two of the clamps, and means adjacent the other side of said turret and operable in timed relation thereto for unloading work simultaneously from two of said clamps.

12. In a machine, a turret, a series of work clamps carried by said turret, a pair of work guides terminating adjacent one side of the turret for registration with said clamps, means operable in timed relation to the turret for transferring work simultaneously from both guides into two of the clamps, and means operable in timed relation to the turret for unloading work simultaneously from two of said clamps including a crosshead adjacent the other side of the turret, and plungers projecting from the crosshead for registration with the clamps in the turret.

13. In a machine, a turret, work clamps carried by the turret in circumferentially spaced relationship, a pair of work guides terminating adjacent one side of the turret for registration with said clamps, means operable in timed relation to the turret for transferring work simultaneously from both guides into two of the clamps, a pair of plungers adjacent the other side of said turret for registration with the clamps in the turret, and means operable in timed relation to the turret for actuating said plungers to unload work simultaneously from two of the clamps.

14. In a machine, a turret having circumferentially spaced radially extending openings in its periphery, work clamping means carried by the turret and including jaws mounted for radial sliding movement at the inner ends of said openings, and a single plunger mounted independently of the turret successively engageable with the openings to hold the turret against turning and engageable with the jaws to clamp the work.

15. In a machine, a turret having circumferentially spaced radially extending openings in its periphery, work clamping means carried by the turret and including jaws mounted for radial sliding movement at the inner ends of said openings, and means for simultaneously holding the turret against turning and for actuating the jaws to clamp the work including a single plunger mounted independently of the turret and successively engageable with the circumferentially spaced openings aforesaid.

16. In a metal working machine, a turret, and a plurality of clamps carried by said turret adjacent the periphery thereof, each of said clamps having an inner stationary jaw and an outer movable jaw, the inner jaws being fixed to said turret, blocks rigid with the outer jaws, one block to each jaw, said blocks and outer jaws being mounted for radial sliding movement between the fixed jaws and the periphery of said turret, the periphery of said turret being provided in radial alignment with the movable jaws with openings, a tool engageable with work in said jaws, and means operable while the tool is in engagement with the work for holding the outer jaws toward the fixed inner jaws to securely clamp the work, including a plunger movable through said openings and positively engageable with said blocks.

GEORGE F. YAGER.
OLIVER J. HEATH.